Aug. 15, 1961  S. F. EYESTONE ET AL  2,995,935
ACCELEROMETER
Filed Nov. 1, 1948  2 Sheets-Sheet 1

S. F. EYESTONE
W. E. DICKINSON
INVENTORS.

BY William R Lane
ATTORNEY

Aug. 15, 1961 S. F. EYESTONE ET AL 2,995,935
ACCELEROMETER
Filed Nov. 1, 1948 2 Sheets-Sheet 2
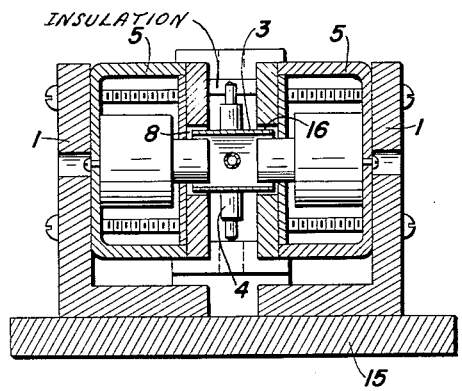
FIG. 5
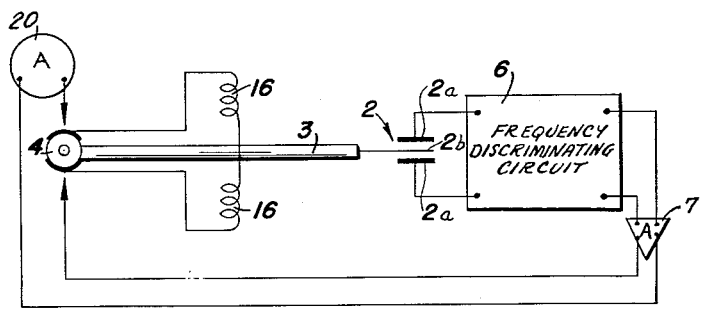
FIG. 6
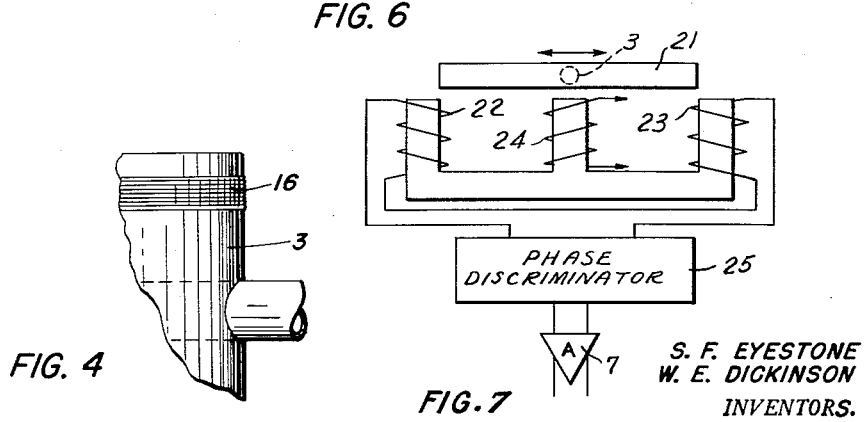
FIG. 4
FIG. 7
S. F. EYESTONE
W. E. DICKINSON
INVENTORS.
BY *William R. Lane*
ATTORNEY 2,995,935
Patented Aug. 15, 1961

1

2,995,935
ACCELEROMETER
Shirley F. Eyestone and Wesley E. Dickinson, Inglewood, Calif., assignors to North American Aviation, Inc.
Filed Nov. 1, 1948, Ser. No. 57,816
5 Claims. (Cl. 73—517)

This invention pertains to the measurement of accelerations by means of a restrained mass.

This invention more particularly pertains to an electrically restrained mass for measuring accelerations.

It is an object of this invention to provide an electromechanical means for utilizing inertia reaction forces in measuring acceleration.

It is a further object of this invention to provide a means for measuring acceleration which is low in friction error by associating with the measuring means a low-friction bearing in combination with a low-friction electrical contact within the bearing.

It is still a further object of this invention to provide a means for measuring acceleration dependent upon introducing the necessary Newtonian acceleration force by electromagnetic means.

Other objects of invention will become apparent from the following description taken in connection with the accompanying drawings, in which:

FIG. 4 is a detailed view of mass 3, to be further described below;

FIG. 5 is a cross-sectional view, taken at 5—5 of the arrangement shown in FIG. 1;

FIG. 6 is a simplified block diagram of the electrical hookup pertaining to the arrangement shown in FIG. 1;

FIG. 7 is a detailed view, partly in schematic, of an electromagnetic pickoff which is used as an alternative to the capacitive pickoff of the apparatus of FIG. 1.

Figure 1:
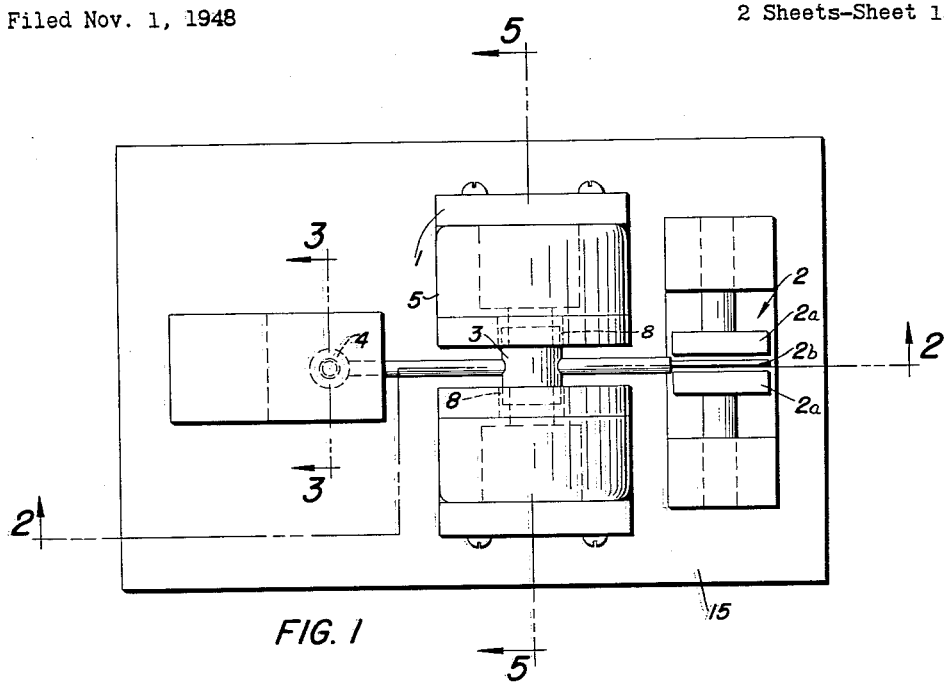
FIG. 1 is a plan view of one arrangement of this invention.

Referring now to the drawings, magnetic circuits are provided consisting of permanent or electromagnets 1, soft iron path and pole pieces 5 and annular air gaps 8. These magnetic circuits are rigidly mounted to the base 15. Mass 3 is so related to the air gaps 8 as to have freedom of movement in the axial direction of the annular air gap. Coils 16 are wound on mass 3 in such a position as to be located midway in the axial dimension of the gap. A capacitor 2 is associated with the foregoing parts in such a manner that its fixed elements 2a are rigidly attached to the base 15 while the movable element 2b is similarly attached to or is integral with the mass 3.

Figure 2:
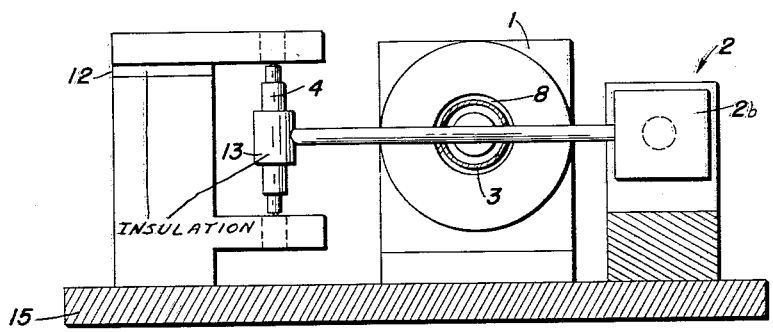
FIG. 2 is a cross-sectional view at 2—2 in FIG. 1.
Figure 3:
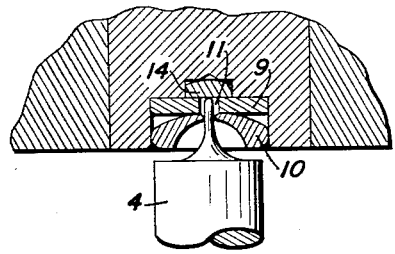
FIG. 3 is an enlarged cross-sectional view at 3—3 in FIG. 1.

The pivot shaft 4 is carried in a low-friction bearing in the arrangement of the invention shown in FIGS. 1 and 2. A detailed cross-section of this bearing is shown in FIG. 3. This part of the invention provides a low-friction jewel-type bearing capable of supporting the mass 3 and also capable of conducting electricity from or to some external source through the bearing to or from the coils 16 situated on the mass 3. Thus, in FIG. 2 insulator 12 is provided so that the opposite ends of pivot shaft 4 may be maintained at opposite polarities, thereby furnishing a convenient circuit through which is passed the electric current which is supplied to the coils 16. The two ends of pivot shaft 4 are insulated from each other by an insulator 13. In FIG. 3 pivot shaft 4 is free to rotate in jewel 10 which fits pivot shaft 4 closely. A washer 9, made of conducting material such as metal,

2 fits around the end of pivot shaft 4 with considerable clearance at 11 so that pivot shaft 4 never touches washer 9. A cap jewel 14 is provided to resist axial thrust of pivot shaft 4 against the rigid base 15. A small amount of fluid conductor, such as mercury, is placed in space 11 and forms an electrical contact between pivot shaft 4 and washer 9.

Referring now to FIG. 6, when the movable element of condenser 2 attached to or forming a part of the movable mass 3 is displaced with respect to the fixed elements attached to the base 15, a signal is generated by means of a resonant bridge network responsive to the condition of unbalance occasioned by the position of the movable element with respect to either of the fixed elements. The circuit is composed of the capacitance 2 which together with a frequency discriminating circuit 6 forms a relative position detector, and an amplifier 7.

As an alternative arrangement, the capacitance pickoff 2 may be replaced by an electromagnetic pickoff shown in detail in FIG. 7. Armature 21 is rigidly attached to mass 3 and is free to move in the directions indicated by the arrows. Primary coil 24 is connected to a source (not shown) of A.-C. potential. When armature 21 is in a null position, equal voltages are induced in secondary coils 22 and 23. Coils 22 and 23 are connected in series opposition as an input to discriminator 25. When armature 21 moves in one direction the respective reluctances of the two magnetic paths change, and the voltage induced in one of the secondary coils exceeds that induced in the other. An unbalanced voltage therefore appears as an input to phase discriminator 25. The phase of this input is determined by the direction of movement of armature 21, and the amplitude of the input is determined by the magnitude of the movement. Phase discriminator 25 converts this input voltage into D.-C. voltage having a polarity which is determined by the phase of the input, and a magnitude dependent on the magnitude of the input. This D.-C. voltage is coupled into amplifier 7.

Figure 8:
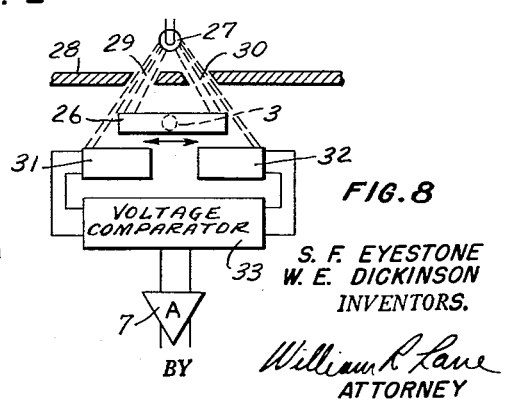
FIG. 8 is a detailed view, partly in schematic, of a photoelectric pickoff which is used as an alternative to the capacitive pickoff of the apparatus of FIG. 1.

A second alternative arrangement which may be substituted for capacitive pickoff 2 is a photoelectric pickoff, shown schematically in FIG. 8. Shutter 26 is rigidly attached to mass 3 and is free to move in the directions indicated by the arrows. Source 27 of light is placed behind collimator 28 which has two spaced slots 29 and 30. Photosensitive cells 31 and 32 are positioned opposite to slots 29 and 30, respectively. When shutter 26 is in a null position, cells 31 and 32 receive equal amounts of light from source 27. The voltages generated by the cells are therefore equal. Voltage comparator 33 compares these voltages, and as long as the amount of light falling on cells 31 and 32 remains equal there is no output from the comparator. If shutter 26 moves to one side, one of the cells receives more light than the other. Therefore, the former cell develops a greater voltage than the latter. The voltage inputs to voltage comparator 33 are therefore unbalanced, and the comparator generates a D.-C. output voltage whose polarity is determined by the cell receiving the most light and whose magnitude is determined by the magnitude of the difference between the input voltages. This D.-C. voltage is coupled into amplifier 7.

Referring now to capacitive pickoff 2 of FIG. 6, the relative unbalane of the movable element with respect to the stationary elements results in an unbalance of the capacities in a resonant bridge network, moving one of the resonating networks of the bridge network toward resonance, and the other away from resonance. The discriminator measures the difference in amplitude of the oscillations in the two sides of the bridge network, and provides a direct current control signal proportional to the deviation of the movable element from its neutral position. This results in a control signal proportional to the relative position of the movable mass with respect to the rigid frame.

The output voltage from the frequency discriminator network serves to control the input to the electromagnetic actuating means and hence to control the magnitude of the force thereby produced to oppose the reversed effective force due to acceleration.

When th base 15 is accelerated, according to d'Alembert's principle, the reversed effective force due to acceleration tends to move the mass away from neutral position, relative to the base 15, in the opposite direction from the direction of the acceleration. The mass 3 is held by the low-friction supporting means in an unchanged position relative to the base 15 and to the electromagnetic actuating means except for rotations about the pivot axis of the shaft 4. When, because of this rotation, the mass begins to close the distance between it and the reference frame, the capacitance existing between the movable part of the condenser (attached to the moving mass) and the stationary parts (attached to the base 15) is varied in such a way as to cause a signal to flow from the discriminator to the amplifier. The signal is there amplified to a magnitude sufficient to operate the electromagnetic actuating means. This output current from the amplifier is connected through meter 20 to the coils 16 in the magnetic field of the air gap 8 in the proper manner to supply a force which counteracts the force due to acceleration in such a way as to restore an equilibrium of forces. The magnitude of the acceleration at any time is proportional to and measured by the electric current flowing through meter 20.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Acceleration measuring means comprising a mass including an electromagnet subject to acceleration, electrical position pickoff means for detecting movement of said mass, a low friction conducting pivot for restricting said mass to angular motion in a single plane and for conducting electricity to said electromagnet without imposing restraining torques thereupon, amplifier means for applying to said electromagnet an electrical signal proportional to the movement of said mass about said pivot in response to accelerations, permanent fixed magnets positioned in close proximity to said electromagnet for strong magnetic interaction therewith, said electrical signal applied to said electromagnets being applied in a sense such that the resultant magnetic force on said electromagnet opposes the force produced by said acceleration and restores the movement of said mass in response to said acceleration, and meter means for measuring the current in said electromagnet to thereby indicate the magnitude of said acceleration.

2. A measuring means comprising a mass free to move along an axis including an electromagnetic coil around the periphery of said mass coaxial with said axis, a fixed magnet having a radial field intercepting said coil, means for detecting the motion of said mass along said axis due to a change in velocity, and current producing means responsive to said detector means connected to supply current to said coil proportional to the movement of said mass in a sense such that the resultant force between said electromagnetic coil and said radial magnetic field exactly opposes the force on said mass due to said change in velocity whereby the current produced is a measure of said change in velocity.

3. A measuring means comprising a movable mass, low friction means for supporting said mass, a cylindrical electromagnetic coil operatively associated with said mass, a fixed permanent magnet positioned with its field radial of the axis of said coil, capacitive detector means for detecting the motion of said mass under an impressed acceleration, and means responsive to said detector means furnishing a current to said coil in a direction and of a magnitude to react with said permanent magnet field to restrain the motion of said mass when subjected to an acceleration whereby the current necessary to restrain said mass in an unchanged condition is a measure of the impressed acceleration.

4. A measuring means comprising a mass magnetically restrained in a neutral position with at least one degree of freedom; means for electrically measuring deflection of said mass from said neutral position due to an external change in velocity; means, including an electromagnetic coil attached to said mass and stationary magnets positioned in close proximity to said electromagnetic coil, for exerting strong interactive magnetic forces on said mass; means for converting said measured deflection into an electric signal; and means for applying said signal to said coil in a direction and of a magnitude to cause said magnetic force means to restrain movement of said mass due to said change in velocity whereby the magnitude of said electrical signal is proportional to said acceleration.

5. A measuring means comprising a mass subjected to acceleration, means for detecting the movement of said mass, means including an electromagnet and a permanent magnet positioned to magnetically interact therewith for applying an electromagnetic force to said mass, means for producing an electrical signal proportional to the movement of said mass, means for amplifying said signal, and means for applying said amplifying signal to said electromagnet whereby when an applied acceleration causes movement of said mass and when said signal is applied to said electromagnet and magnitude of said signal measures the acceleration applied and said mass is restored to its original position.

References Cited in the file of this patent

UNITED STATES PATENTS

| | | |
|---|---|---|
| 1,754,085 | Faus | Apr. 8, 1930 |
| 2,127,196 | Worley | Aug. 16, 1938 |
| 2,193,910 | Wilson | Mar. 19, 1940 |
| 2,317,028 | Chappel | Apr. 20, 1943 |
| 2,338,732 | Nosker | Jan. 11, 1944 |
| 2,352,266 | Keinath | June 27, 1944 |
| 2,371,040 | Fisher | Mar. 6, 1945 |
| 2,498,118 | Weiss | Feb. 21, 1950 |